United States Patent [19]

Lamonica

[11] 3,924,570
[45] Dec. 9, 1975

[54] AQUARIUM SCENIC FILTER IN FISH TANK

[76] Inventor: Mercurio Lamonica, 7214 17th Ave., 1st Floor, Brooklyn, N.Y. 11204

[22] Filed: Sept. 13, 1974

[21] Appl. No.: 505,648

[52] U.S. Cl. ................................. 119/5; 210/169
[51] Int. Cl.² ........................................... A01K 63/00
[58] Field of Search ..................... 119/5, 3; 210/169

[56] References Cited
UNITED STATES PATENTS

| | | |
|---|---|---|
| 2,137,397 | 11/1938 | Haldeman .......................... 119/5 X |
| 2,179,095 | 11/1939 | Kelsey ................................ 119/5 X |
| 2,275,428 | 3/1942 | Haldeman .......................... 119/5 X |
| 3,151,069 | 9/1964 | Halpert ............................... 119/5 X |
| 3,273,717 | 9/1966 | Canterbury ........................ 119/5 X |

*Primary Examiner*—J. N. Eskovitz
*Attorney, Agent, or Firm*—Richard L. Miller

[57] ABSTRACT

An improved filter unit for installation in a fish tank; the filter including a perforated hollow base that forms a floor for the tank and from which there protrudes upwardly a container of charcoal and fiberglass; the fish tank water circulating through the hollow base and container and at a same time being generated with fresh air.

2 Claims, 5 Drawing Figures

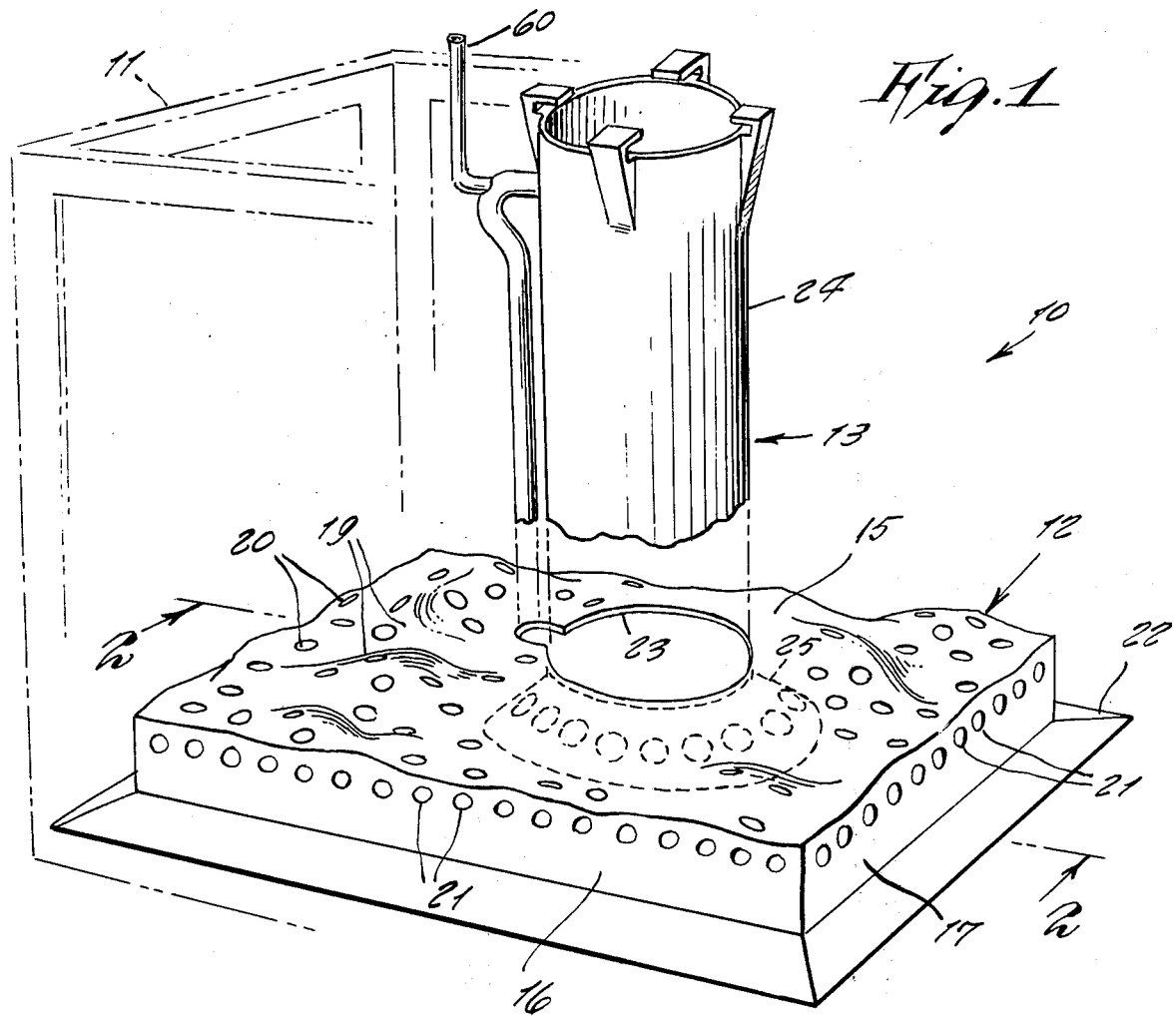
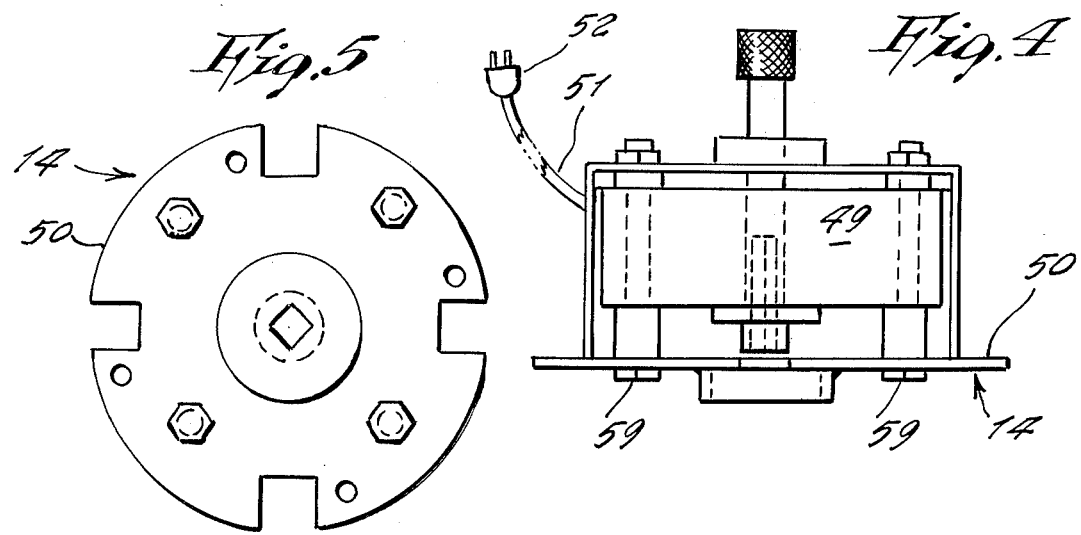

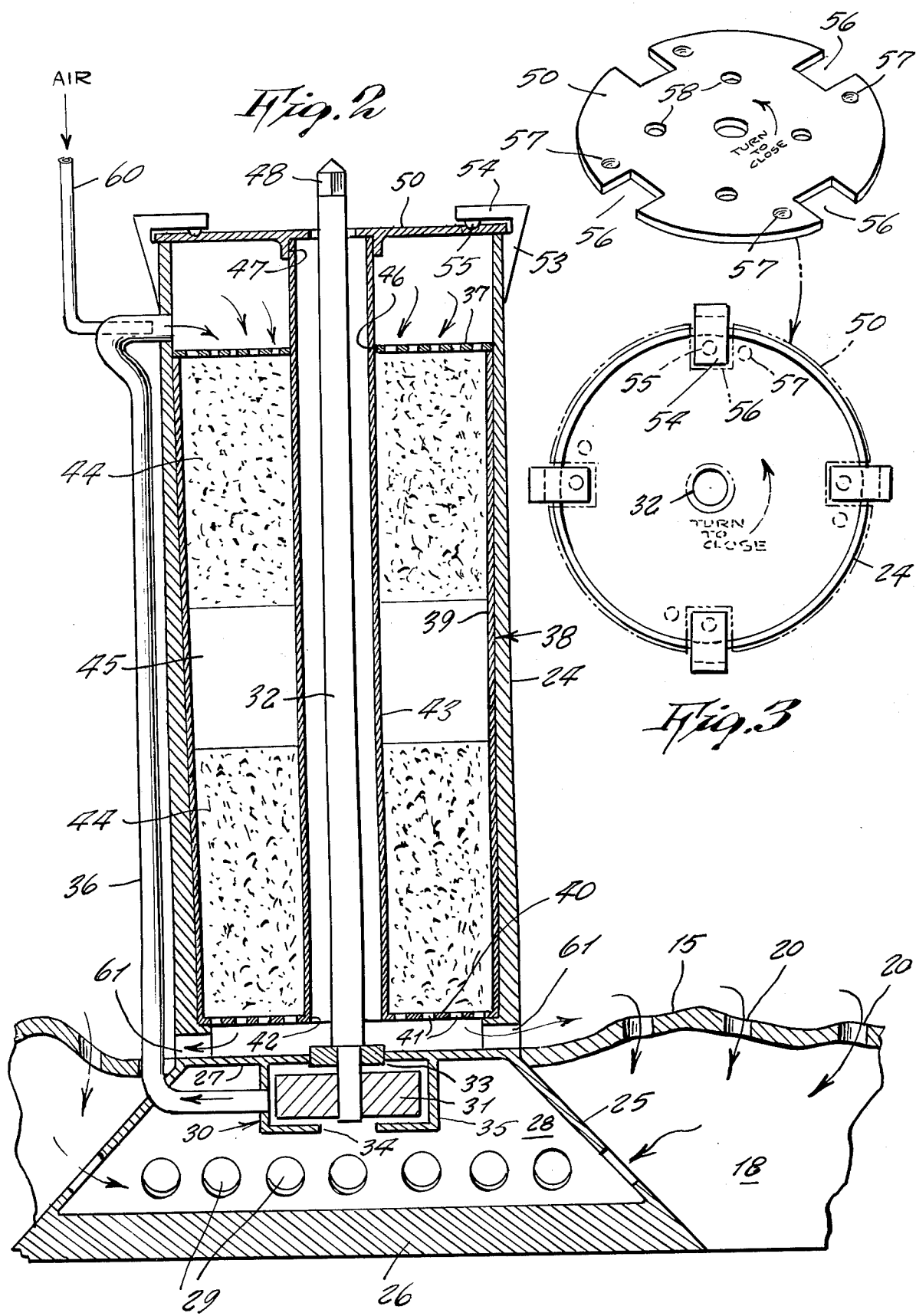

AQUARIUM SCENIC FILTER IN FISH TANK

This invention relates generally to fish aquariums, particularly for home use.

A principle object of the present invention is to provide an improved filter unit for fish tanks which more thoroughly filters all the water in the tank.

Another object is to provide an improved filter that includes a contoured base so to better resemble a bottom of a body of water, thus being more scenic.

Still another object is to provide an aquarium scenic filter which may be manufactured in different standard sizes in order to fit all conventional sizes of home fish tanks.

Other objects are to provide an aquarium scenic filter in fish tank which is simple in design, inexpensive to manufacture, rugged in construction, easy to use and efficient in operation.

These and other objects will be readily evident upon a study of the following specification and the accompanying drawings wherein:

FIG. 1 is a perspective view of the present invention.

FIG. 2 is a framentary cross-sectional view taken on line 2—2 of FIG. 1.

FIG. 3 is a top view of an upright component thereof that is shown in FIG. 1.

FIG. 4 is a side view of an end cap therefore, and an electric motor incorporated in the end cap.

FIG. 5 is a bottom view of the structure of FIG. 4.

Referring now to the drawings in detail, the reference numeral 10 represents an aquarium scenic filter according to the present invention, and which is designed for installation within a fish tank 11.

The filter 10 includes a hollow base 12 in which there is fitted an upstanding cylindrical container 13 that is surmounted by a removable top end cap 14.

The base 12, made preferably of molded plastic material in order to not be expensive and also to not chemically effect the aquarium water, is made to fit the entire bottom of the tank 11, and includes a top wall 15 integrally with opposite side walls 16 and end walls 17 that surround a hollow interior space 18. The base includes not bottom wall. The upper side of the top wall 15 may be contoured with hills and valleys as shown at 19 in FIG. 1 in order that resemblies an uneven actual underwater landscape of a bottom of a sea, lake or river. It can accordingly, be likewise colored in colors that resemble the actual scene. The top wall is perforated throughout its area with a plurality of small perforated openings 20 in order that the fish tank water can circulate therethrough. Likewise, perforated openings 21 are provided through the side and end walls for the same purpose. The side walls and end walls are slightly set back from a peripherally extending foot 22 integral with the loew edges of these side and end walls.

The container 13 is fitted upwardly through a large central opening 23 made through the top wall and includes a cylindrical side wall 24 which at its lower end enjoins a downwardly flaring conical wall 25 which together with a bottom wall 26 and a higher wall 27 form a central chamber 28. The conical wall is perforated with openings 29 so water can circulate into the chamber 28.

A small water pump 30 is integral with underside of wall 27 and which contains an impeller 31 on a lower end of a shaft 32 journalled in a bearing 33 in the wall 27. An opening 34 allows water from chamber 28 to be pulled into the pump impeller. The pump housing 35 is connected to a water outlet tube 36 which at its other end opens inside the upper end of the cylindrical wall 24 so that pumped water thus pours out from the tube upon a perforated screen 37 placed over a downwardly tapered removable filter vessel 38 that includes side wall 39 and a bottom wall 40 perforated with openings 41. A large central opening 42 in the bottom wall 41 is at a lower end of a central tube 43 integral with the filter vessel.

Layers of charcoal 44 with fiberglass 45 therebetween are packed into the filter vessel as shown in FIG. 2. The upper end of the tube 43 extends upward through a central opening 46 of the screen 37 and is fitted into a flanged recess 47 on the underside of the removable end cap 14 which rests upon an upper edge of the cylindrical wall 24. The shaft 32 extends upwardly through the tube 43, and the upper end of the shaft is cross sectionally keyed square as shown at 48 so to be driven by an electric motor 49 mounted on an upper side of an end cap circular plate 50. An electric power cord 51 connected to the motor has a plug 52 on its end for insertion into a household electric supply socket.

The end cap is securable upon the container 13 by means of several L-shaped projections 53 integral with the outer surface of the cylindrical side wall 24 and which each accordingly includes a radially inwardly extending arm 54 having button 55 on its end for bearing down upon the upper side of plate 50. In order to permit insertion of the plate under the arms, the plate includes peripheral motches 56 so to clear the arms when placed vertically down upon the container, as shown in FIG. 3, after which the plate is rotated a few degrees so that the plate slides under the arms and the buttons are engaged within depressions 57 formed upon the upper side of the plate. The container 13 accordingly is likewise made of molded plastic for the same reasons as plastic base 12 and also so that the arms flex very slightly so that the buttons snap into the depressions 57 so to hold the cap securely.

Openings 58 on the plate 50 receive motor mounting bolts 59. An air vent tube 60 of L-shape is connected at one end within the water tube 36 and the other end projects upwardly so to extend above the water level of the tank.

In operative use, it is now evident, that the motor 49 drives the pump impeller 31 causing water to be pulled from the tank 11 downwardly through openings 20 into chamber 18, then through openings 29 into chamber 28 from where the impeller pulls the water through openings 34 and into the tube 36. The moving water in the tube 36 pulls fresh air to mix therewith by means of vent tube 60. This air charged water is then poured over the vessel 38 so that gravity forces it through the charcoal and fiberglass filters. The water and air thus purified, leaves the container 13 through openings 61 located in side walls 24 below the filter vessel 38, thus returning back into the tank for use by the fish. Thus an improved scenic filter is provided. While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. In an aquarium scenic filter for a fish tank, the combination of a hollow base, an upstanding filter container supported by said base, and a removable end cap upon a top of said container, said hollow base consists of a top wall integral with downward side and end walls forming a base chamber, said top wall being perforated throughout its entire area with small openings, and a upper side of said top wall being contoured to resemble a bottom of a sea, lake or river and being accordingly colored, said container contains a vessel filled with layers of charcoal and fiberglass, a water pump within a lower end of said container being connected to a tube which at its other end is connected to an upper position of said container in order to pour pumped water upon said filter containing vessel, wherein an air vent tube is connected to an intermediate portion of said tube so that air is merged with said water, wherein L-shaped projections integral with an outside side of said container each includes a radially inward arm for bearing down upon a circular plate of said end cap, said plate including peripheral notches to clear said arms when being vertically placed upon said container and prior to being rotated under said arms, wherein an electric motor is mounted upon said end cap plate, a disengagable motor shaft of said motor extending downwardly through a central tube integral with said vessel, and a lower end of said shaft being connected to a water impeller of said pump.

2. The combination as set forth in claim 1 wherein said container is fitted through a central opening of said base, a lower conical end of said container having a chamber containing said pump, and said container chamber communication with said base chamber by means of side openings through said conical end.

* * * * *